US010581860B2

(12) United States Patent
Li et al.

(10) Patent No.: US 10,581,860 B2
(45) Date of Patent: Mar. 3, 2020

(54) BLACKLIST MANAGEMENT METHOD FOR IBC-BASED DISTRIBUTED AUTHENTICATION FRAMEWORK

(71) Applicant: Huawei International Pte. Ltd., Singapore (SG)

(72) Inventors: Lichun Li, Shenzhen (CN); Haiguang Wang, Singapore (SG); Xin Kang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/372,668

(22) Filed: Apr. 2, 2019

(65) Prior Publication Data

US 2019/0297083 A1 Sep. 26, 2019

Related U.S. Application Data

(63) Continuation of application No. PCT/SG2017/050361, filed on Jul. 19, 2017.

(30) Foreign Application Priority Data

Oct. 3, 2016 (SG) .......................... 10201608276U

(51) Int. Cl.
*H04L 29/06* (2006.01)
*H04W 12/08* (2009.01)
(Continued)

(52) U.S. Cl.
CPC ............ *H04L 63/101* (2013.01); *H04L 63/08* (2013.01); *H04W 12/0401* (2019.01);
(Continued)

(58) Field of Classification Search
CPC ...... H04L 63/101; H04L 63/08; H04W 12/08; H04W 12/0802; H04W 76/11; H04W 12/06; H04W 12/0401; H04W 12/12
See application file for complete search history.

(56) References Cited

U.S. PATENT DOCUMENTS

2006/0023887 A1 2/2006 Agrawal et al.
2008/0091941 A1* 4/2008 Yonezawa ............. H04L 9/3255
713/158
(Continued)

FOREIGN PATENT DOCUMENTS

CN 101034989 A 9/2007
CN 102027705 A 4/2011
(Continued)

*Primary Examiner* — Darren B Schwartz
(74) *Attorney, Agent, or Firm* — Leydig, Voit & Mayer, Ltd.

(57) ABSTRACT

A system for managing and distributing a blacklist of User Equipment IDs (UE IDs) in a network. The system comprises a number of groups of networks, each of the groups of networks comprise a blacklist server and a number of authentication servers. The system further comprises a Package Key Generator (PKG). The blacklist server is configured to: store a blacklist containing UE IDs that are not allowed to gain access to the network; transmit the blacklist to the plurality of authentication servers in the same group; receive a message; determine a content in the message is an order to add a new revoked UE ID to the blacklist; update the blacklist to include the new revoked UE ID; and send an update blacklist message to the plurality of authentication servers in the same group.

6 Claims, 11 Drawing Sheets

(51) Int. Cl.
*H04W 76/11* (2018.01)
*H04W 12/06* (2009.01)
*H04W 12/04* (2009.01)
*H04W 12/12* (2009.01)

(52) U.S. Cl.
CPC ........... *H04W 12/06* (2013.01); *H04W 12/08* (2013.01); *H04W 12/0802* (2019.01); *H04W 76/11* (2018.02); *H04W 12/12* (2013.01)

(56) References Cited

U.S. PATENT DOCUMENTS

| | | | |
|---|---|---|---|
| 2008/0133414 A1* | 6/2008 | Qin | G06F 21/10 705/50 |
| 2008/0184350 A1* | 7/2008 | Chu | G06F 21/10 726/7 |
| 2008/0220740 A1 | 9/2008 | Shatzkamer et al. | |
| 2009/0235071 A1 | 9/2009 | Bellur et al. | |
| 2009/0238365 A1 | 9/2009 | Bardera | |
| 2009/0245176 A1* | 10/2009 | Balasubramanian | H04W 48/20 370/328 |
| 2009/0287935 A1* | 11/2009 | Aull | H04L 9/3263 713/182 |
| 2012/0108227 A1 | 5/2012 | Moore et al. | |
| 2012/0308012 A1 | 12/2012 | Yoon | |
| 2013/0005328 A1* | 1/2013 | De Benedittis | H04W 36/0055 455/422.1 |
| 2014/0370853 A1 | 12/2014 | Ma et al. | |
| 2015/0140967 A1 | 5/2015 | Leu et al. | |
| 2015/0188937 A1* | 7/2015 | Wu | G06F 21/554 726/22 |
| 2015/0318996 A1 | 11/2015 | Van Roermund | |
| 2016/0050563 A1* | 2/2016 | Bronk | H02J 50/10 726/7 |
| 2018/0241731 A1* | 8/2018 | Guo | G06F 21/57 |

FOREIGN PATENT DOCUMENTS

| | | |
|---|---|---|
| CN | 103052036 A | 4/2013 |
| CN | 101632282 B | 8/2013 |
| CN | 104661218 A | 5/2015 |
| CN | 105100040 A | 11/2015 |
| EP | 2466934 A1 | 6/2012 |
| EP | 2889798 A1 | 7/2015 |

* cited by examiner

BLACKLIST MANAGEMENT METHOD FOR IBC-BASED DISTRIBUTED AUTHENTICATION FRAMEWORK

CROSS-REFERENCE TO RELATED APPLICATIONS

This application is a continuation of International Application No. PCT/SG2017/050361, filed on Jul. 19, 2017, which claims priority to Singapore Patent Application SG10201608276U, filed on Oct. 3, 2016. The disclosures of the aforementioned applications are hereby incorporated by reference in their entireties.

FIELD

This disclosure relates to a method and system for managing and distributing of blacklist in a large scale network.

In the past few years, the number of smart phone users has grown exponentially and many mobile users access the internet via mobile cellular network. As we are approaching the introduction of the 5th generation mobile networks, it is expected that more devices and services will be put on the mobile Internet. It is expected that it could be at least 10-20 times of the mobile devices today, in the number of 50-100 billion. In order to manage such a large number of devices, the current network architecture requires some changes. One reason is that the current network is designed for voice and mobile data services, which implements a centralized user management and authentication method. This is not scalable and the cost for user authentication and management is high.

FIG. 1 shows the existing user authentication and management framework 100. User devices 110 and network use asymmetric key-based authentication technology. At the network side, a centralized server, known as Home Subscriber System (HSS) 130, is used to store the user identity and credentials for authentication. At user side, an embedded device, named as Universal Integrated Circuit Card (UICC), is used to store the user credential. When a user device 110 wants to access the network, the user device 110 performs a mutual authentication 150 with the Mobility Management Entity (MME) 120 in the core network through the EPS-AKA protocol. In a mutual authentication, after receiving the authentication request from user device 110 via the base station 140, the MME 120 further gets authentication vector from HSS 130 and authenticate with user device 110 via the base station 140.

As mentioned above, with the centralized authentication and user management framework, the management cost for large number of devices is very high. Hence, those skilled in the art are striving to improve the current authentication framework.

SUMMARY

The above and other problems are solved and an advance in the art is made by systems and methods provided by embodiments in accordance with this disclosure. A first advantage of embodiments of systems and methods in accordance with this disclosure is that the authentication is decentralized. This reduces the stress that is affected in a centralized system. This would also help to lower operating cost of an operator provider. A second advantage of embodiments of systems and methods in accordance with this disclosure is that a distributed authentication framework allows the network to be scalable. Flexibility is achieved since key generation is assisted by another entity. A third advantage of embodiments of systems and methods in accordance with this disclosure is that an IBC blacklist solution for IBC's usage in wireless network is provided. This reduces the costs of storing and distributing blacklist.

The above advantages are provided by embodiments of a system and method for managing and distributing of a blacklist of User Equipment ID (UE ID) in a network.

In accordance with an aspect of the disclosure, a system for managing and distributing of a blacklist of User Equipment ID (UE ID) in a network is provided in the following manner. The system comprises a number of groups of network and a Package Key Generator (PKG). Each of the groups of network comprises a blacklist server and a number of authentication servers, where the blacklist server is configured to: store a blacklist containing UE IDs that are not supposed to gain access to the network; transmit the blacklist to the authentication servers in the same group; receive a message; determine a content in the message is an order to add a new revoked UE ID in the blacklist; update the blacklist to include the new revoked UE ID; and send an update blacklist message to the authentication servers in the same group.

In accordance with an embodiment of the disclosure, the PKG is configured to: receive an order to add a new revoked UE ID in the blacklist; determine the groups of network associated to the UE ID; send an update blacklist message to the blacklist servers of the determined relevant groups.

In accordance with an embodiment of the disclosure, the blacklist server is further configured to: receive a query from one of the authentication servers from another group, the query containing a UE ID; determine whether the UE ID is in the blacklist; and transmit a response to the authentication server from another group that the UE ID is not in blacklist in response to determining the UE ID is not in the blacklist or a response to the authentication server from another group that the UE ID is in blacklist in response to determining the UE ID is in the blacklist.

In accordance with an embodiment of the disclosure, each of the authentication servers is configured to: store the blacklist in response to receiving the blacklist from the blacklist server. Further, the authentication server is configured to: receive an authentication package from a UE, the authentication package comprising the UE ID; determine whether the UE is in the same group based on information in the authentication package; transmit a query to the blacklist server belonging to the same group of the UE in response to the UE not being in the same group as the authentication server; receive a response from the blacklist server belonging to the same group of the UE; determine whether the UE is in the blacklist of the blacklist server belonging to the same group of the UE from the response; and proceed with authentication procedure in response to the UE is not in the blacklist of the blacklist server belonging to the same group of the UE.

In accordance with an embodiment of the disclosure, each of the authentication servers is further configured to: receive an authentication package from a UE, the authentication package comprising the UE ID; determine whether the UE is in the same group based on information in the authentication package; determine whether the UE is in a local blacklist in response to the UE being in the same group as the authentication server; and proceed with authentication procedure in response to the UE is not in the local blacklist.

In accordance with an embodiment of the disclosure, each of the authentication servers is further configured to: receive an authentication package from a UE, the authentication package comprising the UE ID and a signature; proceed with authentication procedure by verifying the signature; determine whether the UE is in the same group based on information in the authentication package in response the successful verifying the signature; transmit a query to the blacklist server belonging to the same group of the UE in response to the UE not being in the same group as the authentication server; receive a response from the blacklist server belonging to the same group of the UE; determine whether the UE is in the blacklist of the blacklist server belonging to the same group of the UE from the response; and allow the UE access to the network in response to the UE being not in the blacklist of the blacklist server belonging to the same group of the UE.

In accordance with an embodiment of the disclosure, each of the authentication servers is configured to: receive an authentication package from a UE, the authentication package comprising the UE ID and a signature; proceed with authentication procedure by verifying the signature; determine whether the UE is in the same group based on information in the authentication package in response the successful verifying the signature; determine whether the UE is in a local blacklist in response to the UE being in the same group as the authentication server; and allow the UE access to the network in response to the UE being not in the local blacklist.

In accordance with an embodiment of the disclosure, the authentication package comprises a Group ID and the UE is determined to be in the same group based on the Group ID. In accordance with an embodiment of this embodiment, the Group ID is embedded as part of the UE ID.

In accordance with an embodiment of the disclosure, the UE is determined to be in the same group if Group ID is not available in the authentication package.

In accordance with another aspect of the disclosure, a method for managing and distributing of a blacklist of User Equipment ID (UE ID) in a network is provided in the following manner. The network comprises a number of groups of network, each of the groups of network comprises a blacklist server, a number of authentication servers, and a Package Key Generator (PKG). The method comprises the blacklist server to: storing a blacklist containing UE IDs that are not supposed to gain access to the network in the blacklist server; transmitting the blacklist to the authentication servers in the same group; receiving a message; determining a content in the message is an order to add a new revoked UE ID in the blacklist; updating the blacklist in the blacklist server to include the new revoked UE ID; and sending an update blacklist message to the authentication servers in the same group.

In accordance with an embodiment of the disclosure, the method comprises the PKG to: receiving an order to add a new revoked UE ID in the blacklist; determining the groups of network associated to the UE ID; sending an update blacklist message to the blacklist servers of the determined relevant groups.

In accordance with an embodiment of the disclosure, the method comprises the blacklist server to: receiving a query from one of the authentication servers from another group, the query containing a UE ID; determining whether the UE ID is in the blacklist; and transmitting a response to the authentication server from another group that the UE ID is not in blacklist in response to determining the UE ID is not in the blacklist or a response to the authentication server from another group that the UE ID is in blacklist in response to determining the UE ID is in the blacklist.

In accordance with an embodiment of the disclosure, the method comprises each of the authentication servers to: storing the blacklist in response to receiving the blacklist from the blacklist server.

In accordance with an embodiment of the disclosure, the method comprises each of the authentication servers to: receiving an authentication package from a UE, the authentication package comprising the UE ID; determining whether the UE is in the same group based on information in the authentication package; transmitting a query to the blacklist server belonging to the same group of the UE in response to the UE not being in the same group as the authentication server; receiving a response from the blacklist server belonging to the same group of the UE; determining whether the UE is in the blacklist of the blacklist server belonging to the same group of the UE from the response; and proceeding with authentication procedure in response to the UE is not in the blacklist of the blacklist server belonging to the same group of the UE.

In accordance with an embodiment of the disclosure, the method comprises each of the authentication servers to: receiving an authentication package from a UE, the authentication package comprising the UE ID; determining whether the UE is in the same group based on information in the authentication package; determining whether the UE is in a local blacklist in response to the UE being in the same group as the authentication server; and proceeding with authentication procedure in response to the UE is not in the local blacklist.

In accordance with an embodiment of the disclosure, the method comprises each of the authentication servers to: receiving an authentication package from a UE, the authentication package comprising the UE ID and a signature; proceeding with authentication procedure by verifying the signature; determining whether the UE is in the same group based on information in the authentication package in response the successful verifying the signature; transmitting a query to the blacklist server belonging to the same group of the UE in response to the UE not being in the same group as the authentication server; receiving a response from the blacklist server belonging to the same group of the UE; determining whether the UE is in the blacklist of the blacklist server belonging to the same group of the UE from the response; and allowing the UE access to the network in response to the UE being not in the blacklist of the blacklist server belonging to the same group of the UE.

In accordance with an embodiment of the disclosure, the method comprises each of the authentication servers to: receiving an authentication package from a UE, the authentication package comprising the UE ID and a signature; proceeding with authentication procedure by verifying the signature; determining whether the UE is in the same group based on information in the authentication package in response the successful verifying the signature; determining whether the UE is in a local blacklist in response to the UE being in the same group as the authentication server; and allowing the UE access to the network in response to the UE being not in the local blacklist.

In accordance with an embodiment of the disclosure, the authentication package comprises a Group ID and the UE is determined to be in the same group based on the Group ID. In accordance with an embodiment of this embodiment the Group ID is embedded as part of the UE ID.

In accordance with an embodiment of the disclosure, the UE is determined to be in the same group if Group ID is not available in the authentication package.

In accordance with another aspect of the disclosure, a method for managing and distributing of a blacklist of User Equipment ID (UE ID) in a network comprising a number of groups of network, each of the groups of network comprising a blacklist server, a number of authentication server, and a Package Key Generator (PKG), wherein the method comprises the PKG to: receiving an order to add a new revoked UE ID in the blacklist; determining the groups of network associated to the UE ID; and sending an update blacklist message to the blacklist servers of the determined relevant groups.

BRIEF DESCRIPTION OF THE DRAWINGS

The above advantages and features in accordance with this disclosure are described in the following detailed description and are shown in the following drawings.

DETAILED DESCRIPTION

Figure 1:
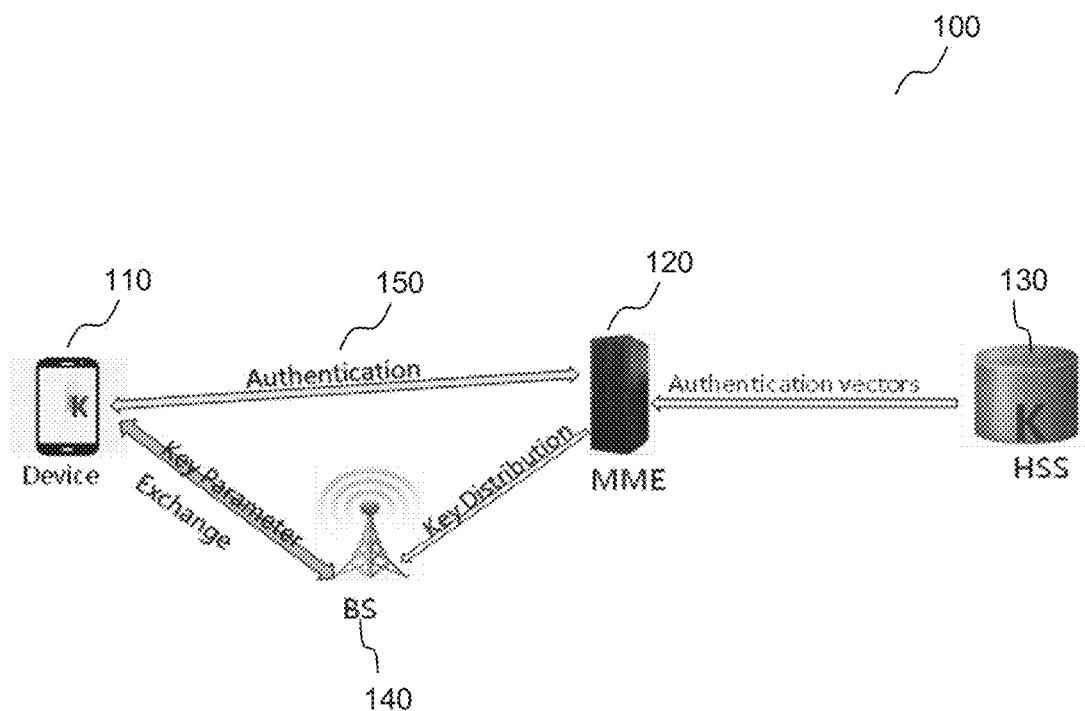
FIG. 1 illustrating an existing user authentication and management framework 100 between users and core network.

This disclosure relates to a method and system for managing and distributing of blacklist in a large scale network.

In this disclosure, it is proposed that the next generation wireless network comprises a distributed identity management and authentication framework based on Identity-Based Cryptography (IBC) to manage and authenticate the device in network accessing.

A brief description on Identity-based cryptography (IBC) will be provided as follows. An IBC is a type of public-key cryptography in which a public key is a known string such as an email address, phone number, domain name, or a physical IP address. For an IBC-based system, a key generator can generate a private key (SKID) for any given ID based on a given Global Public Key (GPK) and Global Secret Key (GSK). The generated private key SKID is distributed to an entity (E) together with GPK and the ID. The entity (E) can be an IOT device, or a base station (B S).

When an entity X wants to authenticate with entity Y, entity X generates a random number first and further generates a signature for the random number with the SKID and GPK based on a known algorithm. Then entity X sends a message with the random number, the signature and its ID to entity Y. After receiving the message, entity Y authenticates the entity X with the received random number, signature, ID of entity X, and the GPK based on a known algorithm. If the verification is successful, entity Y further authenticates with entity X. Similarly, the entity X can also authenticate entity Y with its signature and ID of entity Y.

In light of the above, we can observe that an advantage of the IBC-based authentication is that it does not need a centralized server to preserve the credentials of devices in authentication.

It is noted that in a centralized system, a blacklist server is provided to revoke certain SKIDs. Some of the reasons for revoking an SKID include: SKID being leaked; an entity is banned for misbehaving; an entity fails to pay for the service; an entity chooses not to continue using the service any more. If an SKID is revoked, the corresponding entity's ID is added to the blacklist. Such an ID is called revoked ID. Essentially, the blacklist is a list of UE IDs that are not supposed to gain access to the network.

A black server is provided maintain and distribute the blacklist to users. During an authentication procedure, an entity not only verifies the received signature but also checks if the communicating entity's ID is in the blacklist. The authentication is successful only if the verification is successful and the ID is not in the blacklist. To avoid the blacklist growing infinitely, an SKID expiring mechanism is adopted usually. After adopting such a mechanism, the blacklist contains only the revoked IDs whose corresponding SKIDs have not expired. There are two ways to realize key expiring. The first way is setting an expiration time for GPK and GSK. PKG will generate a new pair of GPK and GSK before the old pair expires. After the expiration time, entities only use the GPK and the SKIDs generated based on the new pair. An entity using expired SKID cannot pass any authentication because the peer entity is using the new GPK in verification. The second way is setting an expiration time for each individual entity ID and its SKID. An entity ID's expiration time is embedded in the ID. If the entity ID expires, the entity needs to use a new ID containing a new expiration time. During an authentication, an entity needs to check whether the peer entity's ID has expired or not. The authentication is successful only if the signature verification is successful and the ID has not expired.

Figure 2:
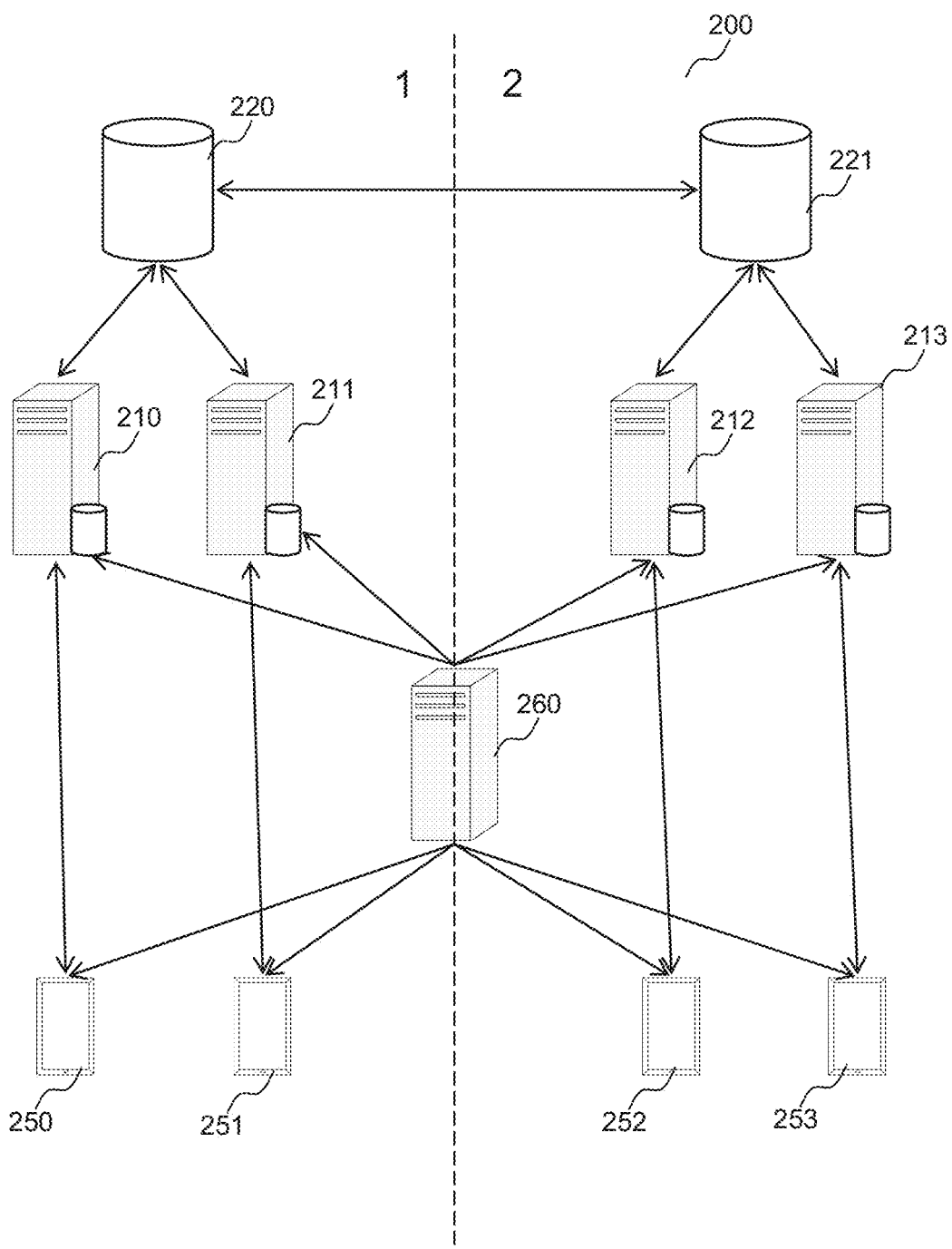
FIG. 2 illustrating an operator network 200 having two groups of network in accordance with an embodiment of this disclosure.

As noted above, a blacklist mechanism is necessary during the authentication process. In a centralized system, only one blacklist server is provided to maintain and distribute the blacklist to users. In this disclosure, instead of using a single blacklist server to maintain and distribute the blacklist of an entire network, it is proposed to provide an architecture of multiple blacklist servers, each of which being responsible for maintaining and distributing a blacklist of User Equipments (UEs) with certain properties. As shown in FIG. 2, an operator network 200 in accordance with this disclosure comprises authentication servers 210-213 and blacklist servers 220-221. In order to access the operator network 200, UEs 250-253 must be authenticated by authentication servers 210-211. The UEs 250 and authentication servers 210 authenticate each other using respective IDs, SKID and GPK generated by the Private Key Generator (PKG) 260 which is based on IBC as discussed above. A UE could be stolen, and a UE's owner may decide not to pay and use the network any more. Hence, a blacklist of UE IDs is needed.

FIG. 2 illustrates an operator network 200 having two groups, namely 1 and 2.

Particularly, blacklist server 220, authentication servers 210 and 211, and UEs 250 and 251 belong to group 1 while blacklist server 221, authentication servers 212 and 213, and UEs 252 and 253 belong to group 2. The UEs are divided into groups where UEs in the same group share the same properties. Properties may refer to a group of UEs in a same geographical area. Alternatively, properties may be based on the type of UE such as electricity meters, water meters, home appliances, etc. An authentication server only authenticates UEs from a certain group. For example, UEs 250 and 251 can only authenticate with either authentication servers 210 and 211 while UEs 252 and 253 can only authenticate with either authentication servers 212 and 213. In each group, a blacklist server is required to maintain and distribute the blacklist of UEs in the same group to the authentication servers.

In another embodiment, further sub-groups may be provided within a group. For example, assuming UE 250 is an electricity meter while UE 251 is a home appliance, UE 250 may be required to authenticate with authentication server 210 while UE 251 may be required to authenticate with authentication server 211.

With the architecture as described in FIG. 2, the load of blacklist maintenance is distributed to multiple blacklist servers. Inevitably, the capacity of a blacklist server is reduced as well. Hence, the costs of distributing and storing blacklists are reduced.

The authentication method and distribution of blacklist by the blacklist servers will now be described as follows.

Figure 3:
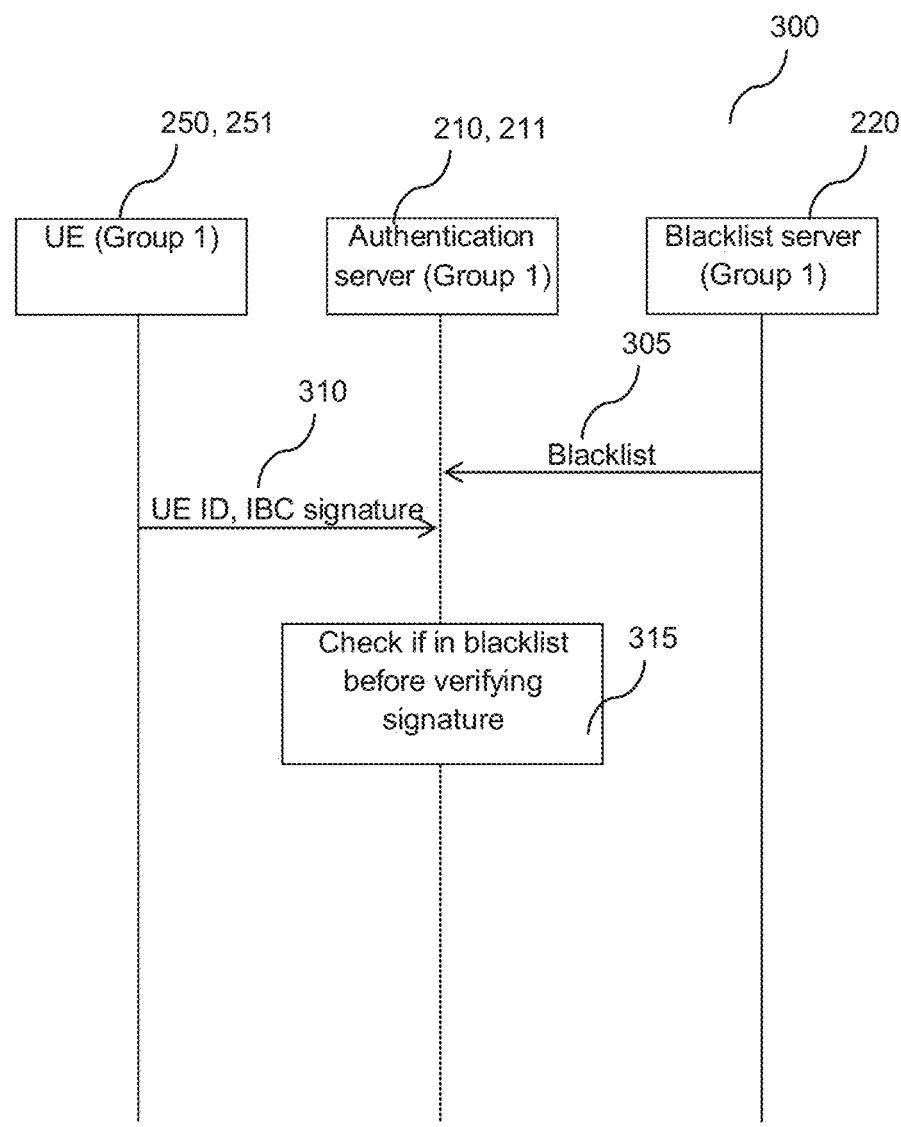
FIG. 3 illustrating a process 300 on a procedure of authentication where an authentication server authenticates a message from a UE in the same group in accordance with an embodiment of this disclosure.

FIG. 3 shows a process 300 on the procedure of authentication where an authentication server authenticates a message from a UE in the same group. Process 300 begins with step 305 where the authentication server obtains a blacklist from the blacklist server belonging to the same group. The blacklist received from the blacklist server is stored on the local blacklist of the authentication server.

In step 310, the authentication server receives a message from a UE in the same group. The message contains the UE's ID and IBC signature. The IBC signature is generated by the UE by signing some data with the UE's SKID. Such data may contain a nonce or a timestamp. Alternatively, the timestamp may be contained in the message. Further, the data may contain the authentication server's ID and a packet (e.g. IP packet) where the message is contained in the packet. Essentially, the UE wants the operator network to deliver the packet.

In step 315, the authentication server checks if the UE ID in the received message is in the blacklist. If yes, the authentication server aborts the authentication procedure. Otherwise, it continues the procedure of verifying if the signature is correct using UE's ID and GPK. If the signature is not correct, the authentication server aborts the authentication procedure. Otherwise, it continues the authentication procedure. As this disclosure is only concern with maintaining and distributing of blacklist, a detailed description of the authentication procedure is omitted. Process 300 ends after step 315.

Figure 4:
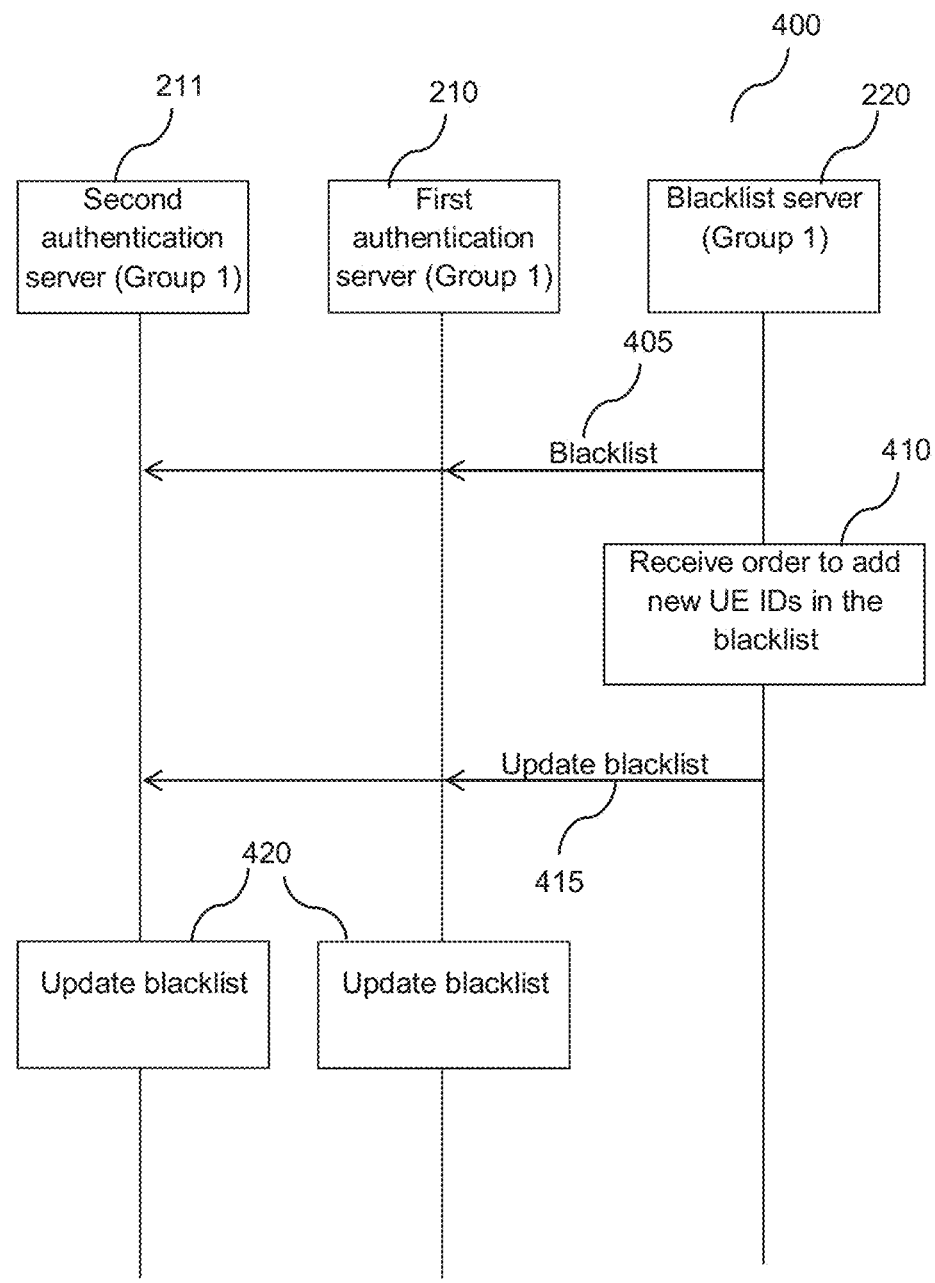
FIG. 4 illustrating a process 400 on a procedure of distributing and updating blacklist in accordance with the framework 200 in accordance with an embodiment of this disclosure.

FIG. 4 illustrates a process 400 on a procedure of distributing and updating blacklist. From time to time, authentication servers are updated when new UE UDs are added to the blacklist. The blacklist server of a group distributes the blacklist to all authentication servers in the same group, and notifies them to update blacklist when the blacklist is updated with new UD IDs.

Process 400 begins with step 405 where the blacklist server sends the blacklist to the first authentication server 210 and second authentication server 211 belonging to the same group.

In step 410, the blacklist server receives an order to add one or more revoked UE IDs to the blacklist. Such order can be triggered by an operator of the operator network. Alternatively, an application may be provided in the operator network to detect malicious users or expiring UE ID and automatically trigger an order to include relevant UE ID in the blacklist.

In step 415, in response to receiving the order, the blacklist server sends an update blacklist message to the first and second authentication servers to notify the newly revoked UE IDs.

In step 420, in response to receiving the update blacklist message from the blacklist server, the first and second authentication servers add the newly revoked UE IDs to respective local blacklist. Process 400 ends after step 420. Essentially, the local blacklist of each authentication server is updated as and when the blacklist server receives a new order to add new UE IDs in the blacklist. This ensures that revoked UEs are prevented from access to the network as soon as possible.

Figure 5:
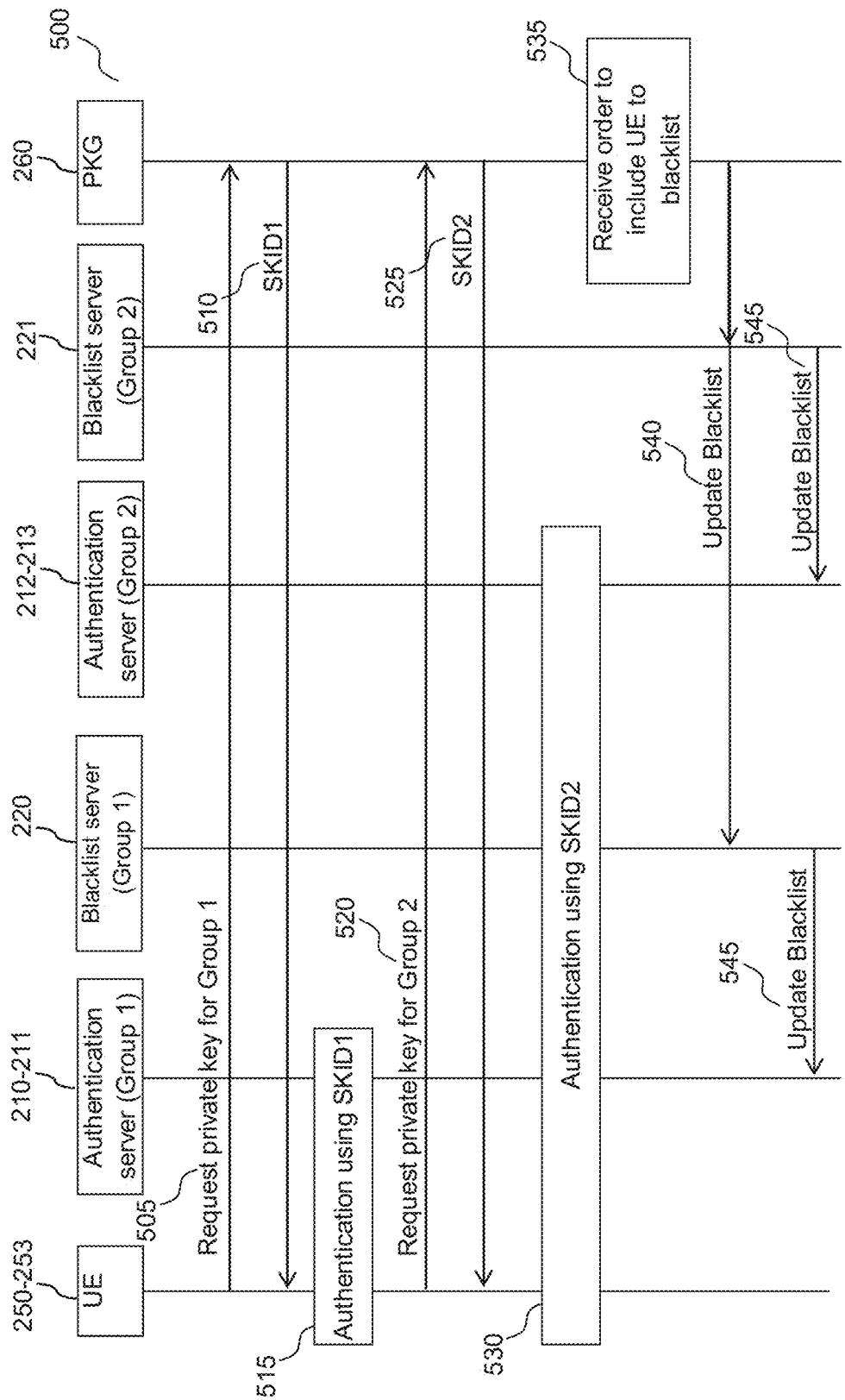
FIG. 5 illustrating a process 500 on a procedure of authenticating and updating blacklist where a UE belongs to multiple groups in accordance with an embodiment of this disclosure.

A UE may belong to multiple groups. When authenticating with the authentication server of a group, the UE should use the SKID for the group. When a UE is revoked, all SKIDs of the UE should be revoked, and the blacklist servers of all the UE's groups should be notified. FIG. 5 illustrates process 500 on the procedure of authentication and updating blacklist where a UE belongs to multiple groups.

Process 500 begins with step 505 where the UE requests for private key for authenticating with Group 1 from the PKG 260. In response to receiving the request for the UE, the PKG would proceed to generate and transmit the secret key (SKID), based on IBC as described above, for the UE specifically for authenticating with authentication server of Group 1 in step 510. In this instance, SKID1 is generated and transmitted to the UE. One skilled in the art would recognise that other information such as UE ID and GPK are also transmitted to the UE in order for the UE to authenticate with the authentication server of Group 1 without departing from the disclosure.

With the SKID1, the UE is able to authenticate with the authentication server of Group 1 in step 515.

In step 520, the UE may request the PKG for the UE's SKID for authenticating with the authentication server of Group 2. In response to receiving the request for the UE, the PKG would proceed to generate and transmit the secret key (SKID), based on IBC as described above, for the UE specifically for authenticating with authentication server of Group 2 in step 525. In this instance, SKID2 is generated and transmitted to the UE. Similarly, other information such as UE ID and GPK are also transmitted to the UE in order for the UE to authenticate with the authentication server of Group 2.

With the SKID2, the UE is able to authenticate with the authentication server of Group 2 in step 530.

In step 535, the PKG receives an order to revoke an UE ID. Such order can be triggered by an operator of the operator network. Alternatively, an application may be provided in the operator network to detect malicious users or expiring UE ID and automatically trigger an order to include relevant UE ID in the blacklist.

In step 540, in response to receiving the order, the PKG determines the relevant groups associated to the UE ID and sends an update blacklist message to the blacklist servers of the relevant groups. In this example, Groups 1 and 2 are determined and the PKG sends the message to notify the blacklist servers of both Groups 1 and 2 to update their blacklist to include the UE ID.

In step 545, in response to receiving the message from the PKG, the blacklist servers of both Groups 1 and 2 update their blacklist and transmit an update blacklist message to their respective authentication servers to notify the newly revoked UE ID. In response to receiving the update blacklist message from the blacklist servers, the authentication servers of Groups 1 and 2 add the newly revoked UE ID to respective local blacklist. Process 500 ends after step 545. Once the local blacklist of each authentication server is updated, the UE would no longer be able to access the network.

Different groups may have different pairs of GPK, GSK. The PKG has all groups' pairs of GPK, GSK. An authentication server must have the GPK of its group. In order to authenticate an UE from another group, an authentication server should have the GPK of the UE's group. Authentication servers can obtain GPKs from PKG. Alternatively, different groups may share the same pair of GPK, GSK. In this case, a UE's public key in a group is the combination of the group ID and the UE's ID. PKG should generate the UE's SKID for the combination instead of UE ID based on the pair of GPK, GSK.

Figure 6:
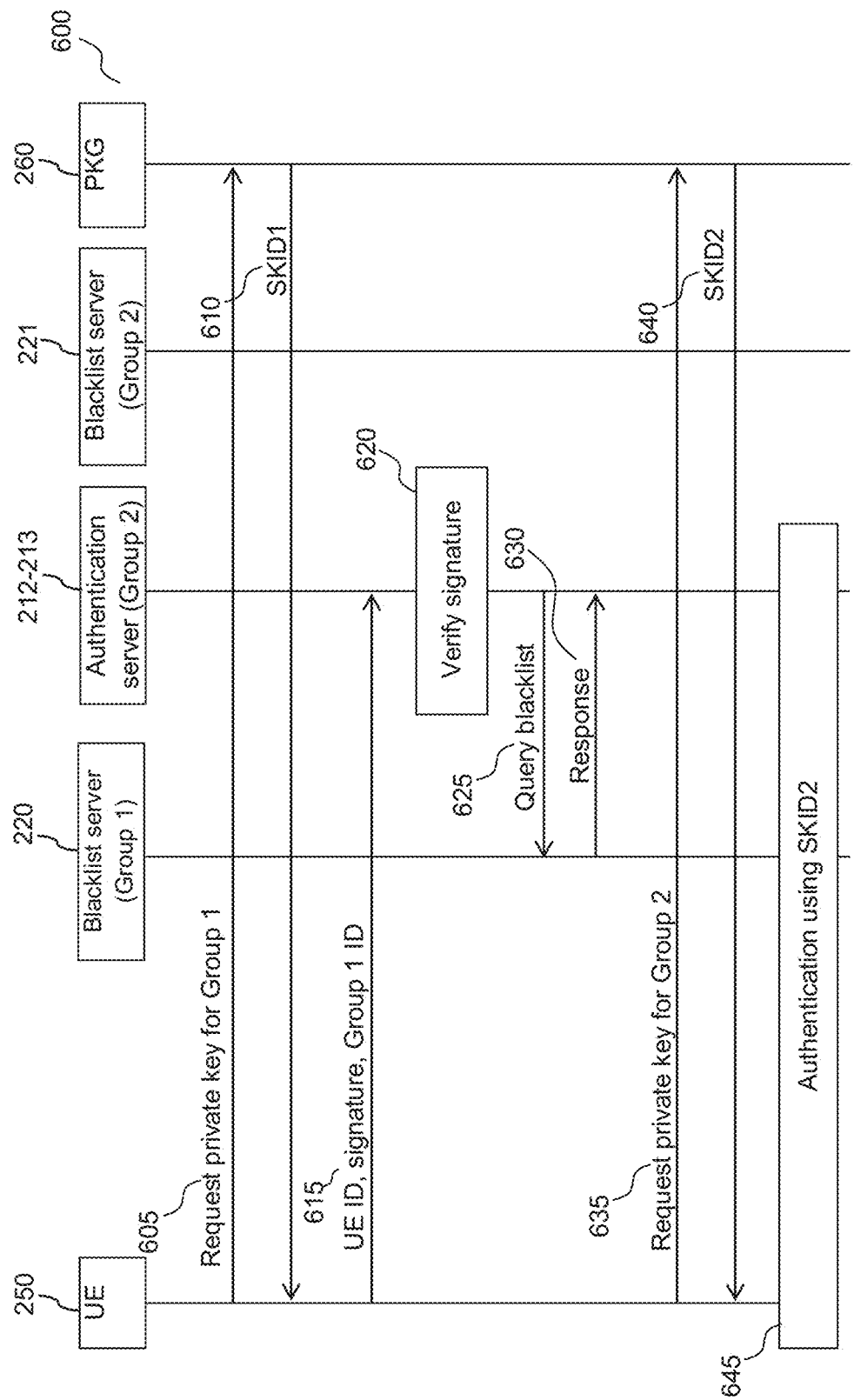
FIG. 6 illustrating a process 600 on a procedure of authentication where a UE authenticate with an authentication server using a SKID from another group in accordance with an embodiment of this disclosure.

A UE may belong to multiple groups. However, before the UE joins a new group, the UE may not have the chance to obtain the relevant SKID for the new group before authenticating with the new group's authentication server. For example, if UE 250 joins Group 1 and thereafter attempts to access Group 2, authentication server 212-213 has to enquire blacklist server 220 on whether UE 250 which belongs to Group 1 is in its blacklist before allowing UE 250 access to network of Group 2. This is relevant to a situation where groups are divided based on geographical areas, and the UE has moved from one area (Group 1) to a new area (Group 2). FIG. 6 illustrates a process 600 on the procedure of authentication in this situation.

Process 600 begins with step 605 where the UE requests PKG for private key for authenticating with Group 1 from the PKG 260. In response to receiving the request from the UE, the PKG would proceed to generate and transmit the secret key (SKID), SKID1 in step 610. These are similar to steps 505 and 510 in process 500.

With the SKID1, the UE is able to authenticate with the authentication server of Group 1 only. However, if the UE wishes to access the network of Group 2 prior to requesting relevant private key from PKG, the UE is able to do so in step 615. Particularly, the UE transmits the usual authentication package for initiating authentication to the authentication server of Group 2. In particular, the UE ID, signature generated with the SKID1, and the Group 1 ID are transmitted to the authentication server of Group 2. Optionally, the Group 1 ID may be part of the UE ID and hence, Group 1 ID may not be required to be transmitted to the authentication server of Group 2.

In step 620, in response to receiving the authentication package from the UE, the authentication server of Group 2 determines that the UE belongs to Group 1 and first verifies the signature using the UE ID and GPK. If not successful, the authentication server of Group 2 aborts the authentication. If successful, the authentication server of Group 2 queries the blacklist server of Group 1 if the UE ID is in the blacklist in step 625.

In step 630, the blacklist server of Group 1 checks against its blacklist to determine whether the UE ID is in the blacklist and responds to the authentication server of Group 2 accordingly. Particularly, if the UE ID is not in the blacklist, the blacklist server of Group 1 responds to the authentication server of Group 2 that the UE ID is not in blacklist. If the UE ID is in the blacklist, the blacklist server of Group 1 responds to the authentication server of Group 2 that the UE ID is in blacklist.

In response to receiving the response from the blacklist server of Group 1, the authentication server of Group 2 determines that the authentication is successful and allows the UE to use the network if the response from authentication server of Group 2 indicates that the UE ID is not in blacklist. Otherwise, authentication server of Group 2 determines that the authentication is unsuccessful and disallows the UE to use the network.

After the UE gains access to the network of Group 2 using SKID1, the UE may request the PKG for private key for authenticating with Group 2 from the PKG 260 in step 635. In response to receiving the request from the UE, the PKG would proceed to generate and transmit the secret key (SKID), SKID2 in step 640. These are similar to steps 520 and 525 in process 500.

In step 645, the UE uses SKID2 for the authentication with the authentication server of Group 2 where require. For example, if the UE lost connection to the network of Group 2 and wants to connect to the network of Group 2 again, the UE now can use SKID2 for the authentication. Process 600 ends after step 645.

Details of the processes undertaken by the blacklist servers, authentication servers, UE and PKG will now be described as follows.

Figure 7:
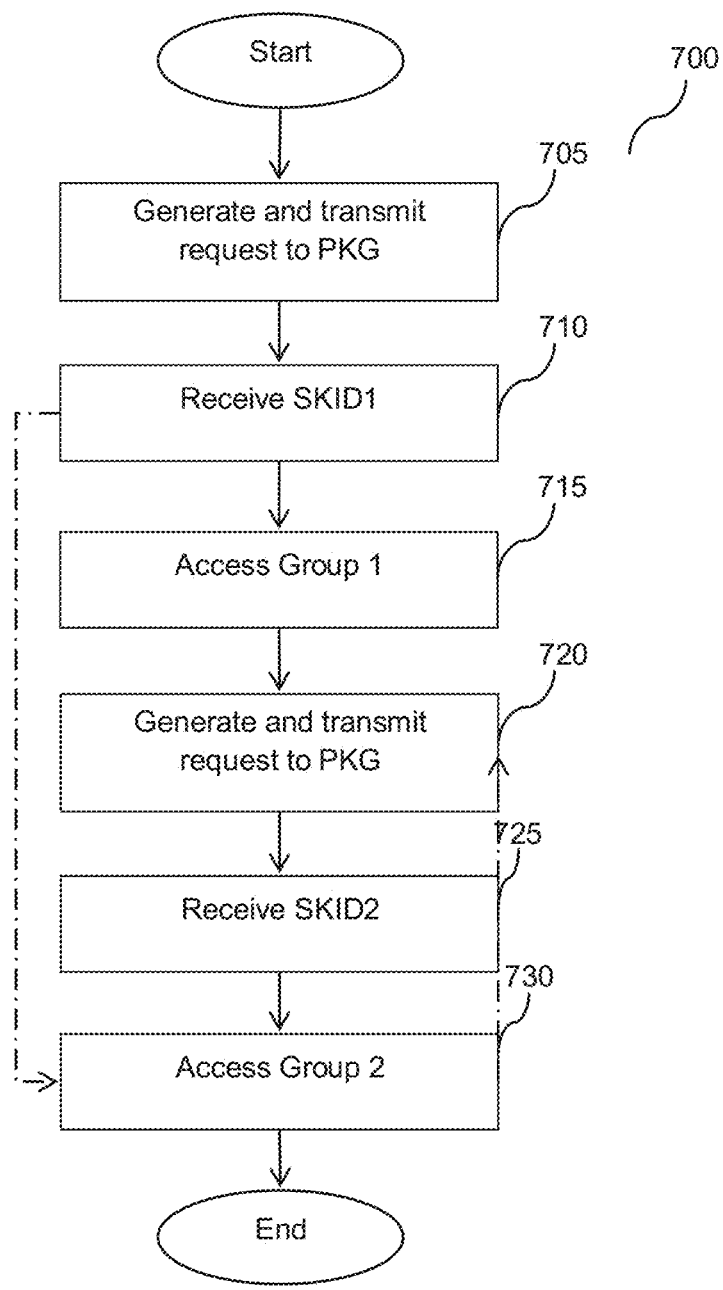
FIG. 7 illustrating a process 700 performed by the UE in accordance with an embodiment of this disclosure.

FIG. 7 illustrates a process 700 performed by the UE in accordance with this disclosure. Process 700 begins with step 705 where the UE generates and transmits a request to the PKG for private key for authenticating with the relevant group. For illustration purpose, the UE requests for SKID to access Group 1. The request would include the necessary information such as UE ID, and Group 1 ID in order to generate the relevant SKID. In another embodiment, the Group ID could be embedded in UE ID. Under such circumstances, the request would not include the Group 1 ID. Instead, the Group 1 ID would be part of the UE ID. In the event that the UE connects to a different group, the UE uses a different UE ID to reflect the ID of the UE and the ID of the group it wishes to connect.

In step 710, the UE receives SKID1 and attempts to access network of Group 1 using SKID1 in step 715. Particularly, the UE transmits an authentication package for initiating authentication to the authentication server of Group 1. The authentication package may include the UE ID, signature generated with the SKID1, and the Group 1 ID. Alternatively, the authentication package may include UE ID and signature generated with the SKID1. Without the Group ID, the authentication server would by default determine that the UE is in the same group. Alternatively, the authentication package may include UE ID and signature generated with the SKID1, where the Group ID is embedded in the UE ID. If authentication is successful, the UE gains access to the network of Group 1. One skilled in the art will recognise that the authentication may begin with the network initiating the authentication procedure by sending a first authentication package to the UE; and in response to receiving the first authentication package, the UE responds by sending a second authentication package containing UE ID and signature to continue with the authentication procedure. In another embodiment, a UE may send a first authentication package to initiate authentication procedure with the network and second authentication package containing UE ID and signature to continue with the authentication procedure. In short, various methods of initiating an authentication procedure between the UE and authentication server of the network may be implemented without departing from the disclosure.

After sometime, the UE may move away from the network of Group 1 and move into network of Group 2. In this situation, the UE generates and transmits a request to the PKG for private key for authenticating with Group 2 in step 720. The request would include the necessary information such as UE ID, and Group 2 ID in order to generate the relevant SKID. Optionally, the UE may proceed directly to step 730 and attempt to gain access to the network of Group 2 using SKID1 and thereafter request for SKID2 from PKG in step 720. This is similar to process 600. In such circumstances, the authentication package that the UE transmits to the authentication server of Group 2 may include UE ID and signature generated with the SKID1 and the Group 1 ID. Alternatively, the authentication package may include UE ID and signature generated with the SKID1, where the Group 1 ID is embedded in the UE ID.

In step 725, the UE receives SKID2 and attempts to access network of Group 2 using SKID2 in step 730. Particularly, the UE transmits an authentication package for initiating authentication to the authentication server of Group 2. The authentication package may include the UE ID, signature generated with the SKID2, and the Group 2 ID. If authentication is successful, the UE gains access to the network of Group 1. Process 700 ends after step 730.

Figure 8:
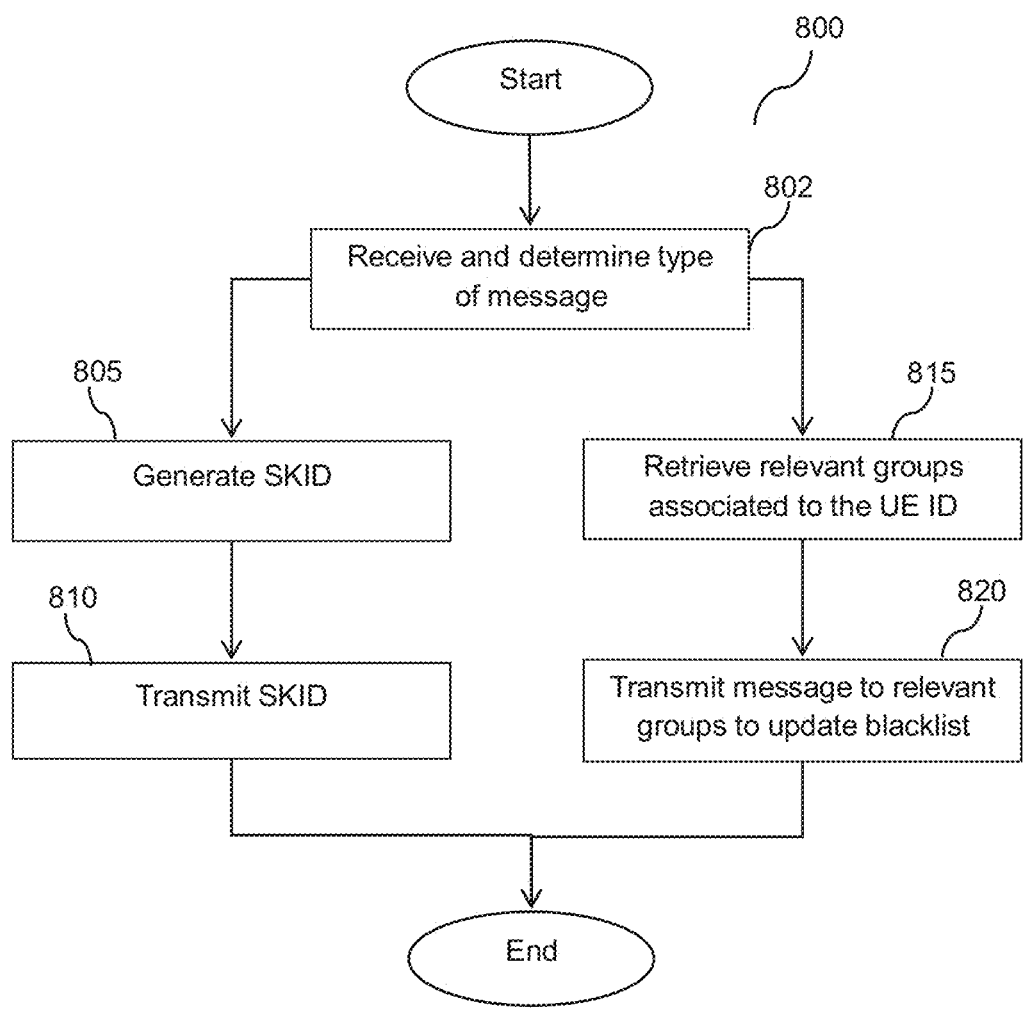
FIG. 8 illustrating a process 800 performed by the PKG in accordance with an embodiment of this disclosure.

FIG. 8 illustrates a process 800 performed by the PKG in accordance with this disclosure. Process 800 begins with step 802 where a message is received. In response to receiving the message, the PKG determines the type of message. In particular, if the message is from a UE requesting for secret key, process 800 proceeds to step 805. If the message is for revoking a UE ID, process 800 proceeds to step 815.

In step 805, the PKG receives a request for secret key from a UE generates an SKID accordingly. In step 810, the PKG transmits the SKID to the UE.

In step 815, the PKG retrieves the relevant groups associated to the revoked UE ID. Particularly, the PKG identifies SKIDs of the UE ID to determine the relevant groups. For example, if SKID1 and SKID2 have been generated for the UE ID, the PKG identifies Group 1 and Group 2. If only SKID1 has been generated for the UE ID, the PKG identifies Group 1.

In step 820, the PKG transmits a message to the relevant groups to update the blacklist to include the UE ID. Process 800 ends after either step 810 or 820.

Figure 9A:
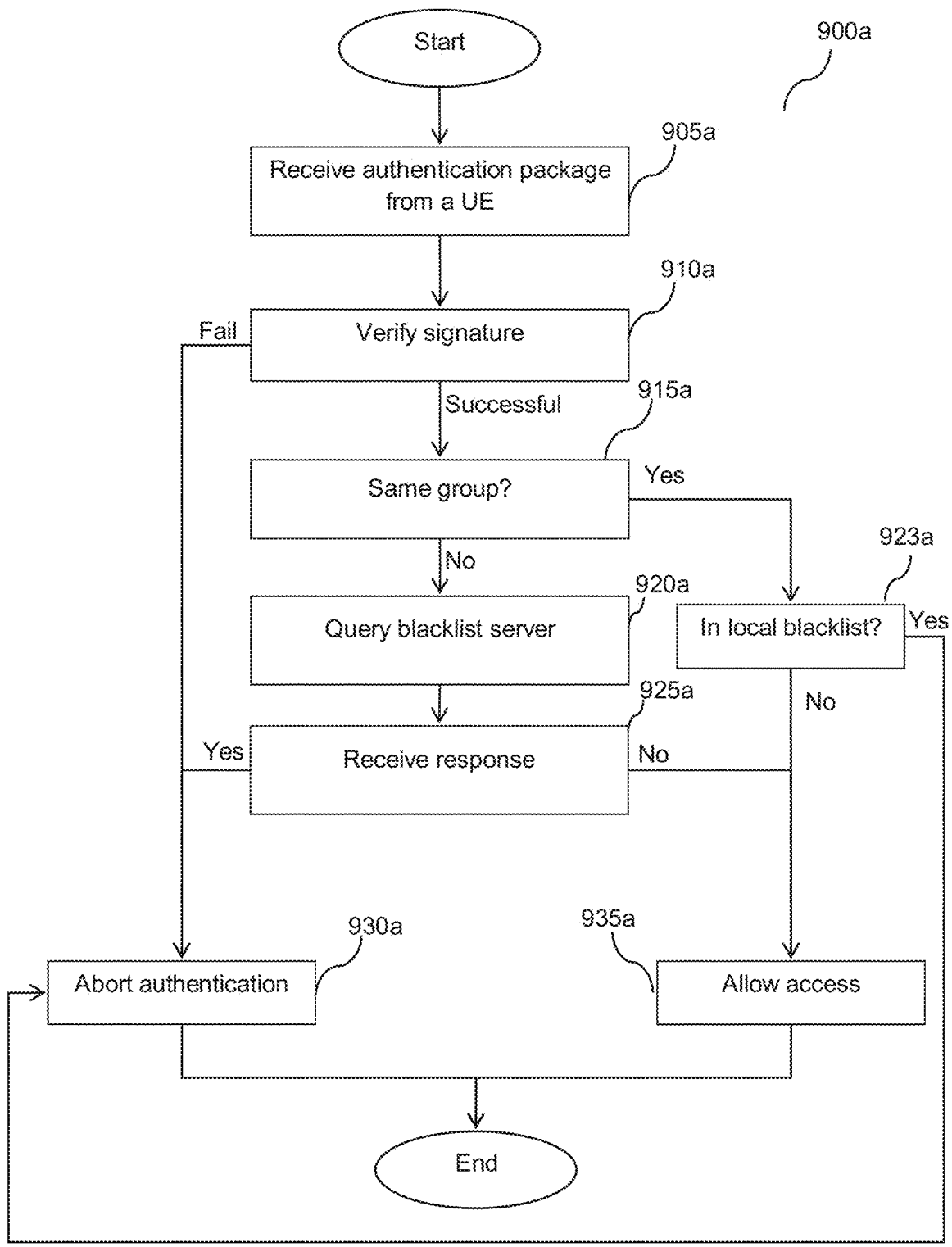
FIG. 9a illustrating a process 900a performed by the authentication server in accordance with an embodiment of this disclosure.

FIG. 9a illustrates a process 900a performed by the authentication server in accordance with this disclosure. Process 900a begins with step 905a by receiving an authentication package from a UE.

In step 910a, the authentication server verifies the signature in the authentication package using the UE ID and GPK. If verification is not successful, the authentication server proceeds to step 930a and aborts the authentication. If verification is successful, the authentication server proceeds to step 915a to determine whether the UE is in the same group.

In step 915a, if the UE is in the same group, process 900a proceeds to step 923b to determine whether the UE is in the local blacklist. If the UE is not in the same group, process 900a proceeds to step 920a. The authentication server determines the group number of the UE based on the UE ID or the Group ID contain in the authentication package. In an embodiment, the authentication server determines that the UE is from a different group if the authentication package comprises Group ID. In another embodiment, if the authentication package does not include Group ID but only include UE ID, the authentication server determines that the UE is from the same group. In yet another embodiment, if the authentication package does not include Group ID but only include UE ID, the authentication server determines whether a Group ID has been embedded in the UE ID in order to determine the Group ID of the UE.

In step 923a, the authentication server determines whether the UE is in the local blacklist. If the UE is in the local blacklist, the authentication server proceeds to step 930b and aborts the authentication. If the UE is not in the local blacklist, the authentication server proceeds to step 935a to allow the UE access to the network.

In step 920a, the authentication server transmits a query to the blacklist server belonging to the same group of the UE.

In step 925a, the authentication server receives a response from the blacklist server and determines whether the UE is in the blacklist of the blacklist server. If the UE is in the blacklist, the authentication server proceeds to step 930a and aborts the authentication. If the UE is not in the blacklist, the authentication server proceeds to step 935a to allow the UE access to the network.

Process 900a ends after either step 930a or 935a.

Figure 9B:
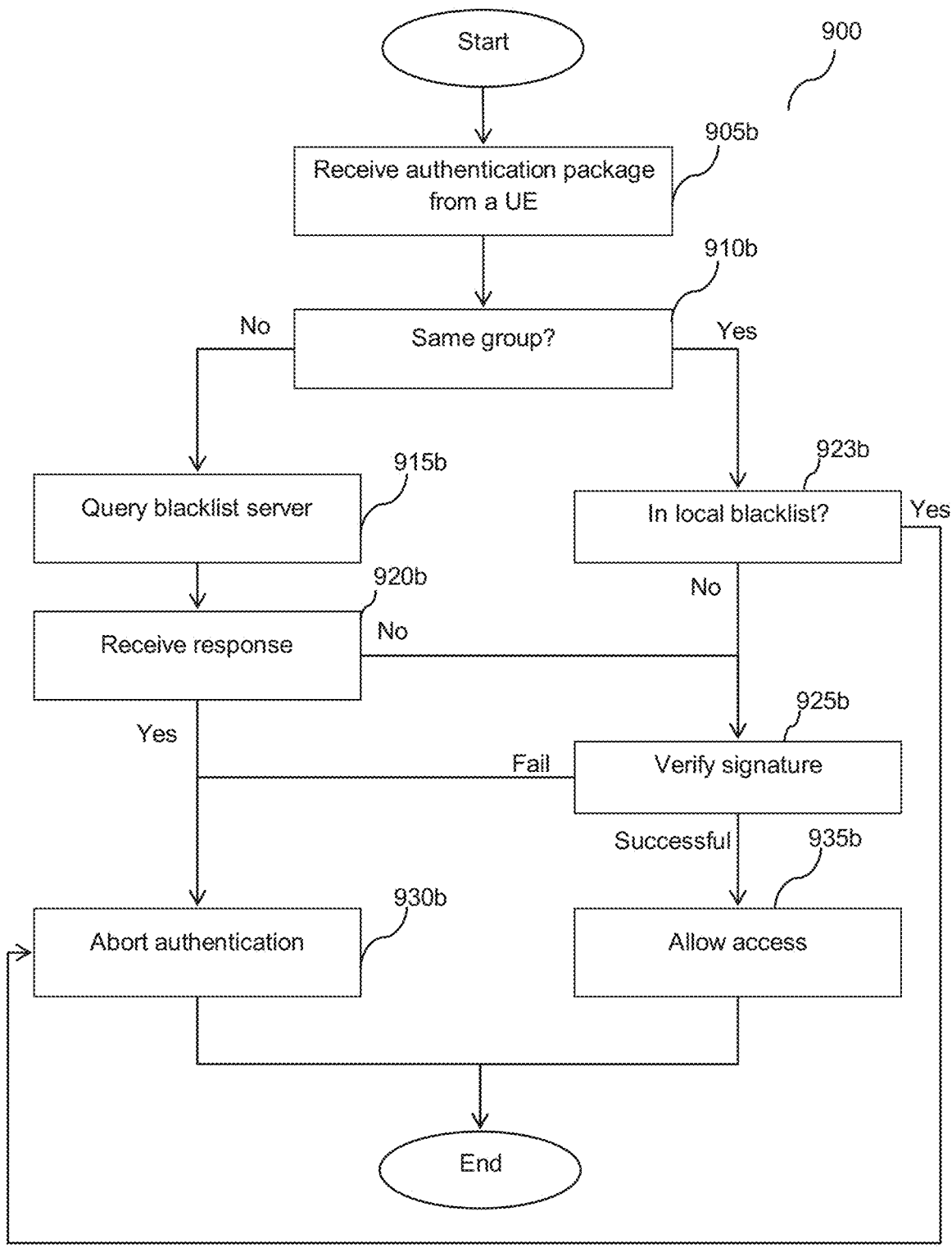
FIG. 9b illustrating an alternative process 900b performed by the authentication server in accordance with an embodiment of this disclosure.

FIG. 9b illustrates an alternative process 900b performed by the authentication server in accordance with this disclosure. Process 900b begins with step 905b by receiving an authentication package from a UE.

In step 910b, the authentication server determines whether the UE is in the same group. If the UE is in the same group, process 900b proceeds to step 923b to determine whether the UE is in the local blacklist. If the UE is not in the same group, process 900b proceeds to step 915b. The authentication server determines the group number of the UE based on the UE ID or the Group ID contain in the authentication package. In an embodiment, the authentication server determines that the UE is from a different group if the authentication package comprises Group ID. In another embodiment, if the authentication package does not include Group ID but only include UE ID, the authentication server determines that the UE is from the same group. In yet another embodiment, if the authentication package does not include Group ID but only include UE ID, the authentication server determines whether a Group ID has been embedded in the UE ID in order to determine the Group ID of the UE.

In step 915b, the authentication server transmits a query to the blacklist server belonging to the same group of the UE.

In step 920b, the authentication server receives a response from the blacklist server and determines whether the UE is in the blacklist of the blacklist server. If the UE is in the blacklist, the authentication server proceeds to step 930b and aborts the authentication. If the UE is not in the blacklist, the authentication server proceeds to step 925*b* to verify the signature in the authentication package using the UE ID and GPK.

In step 923*b*, the authentication server determines whether the UE is in the local blacklist. If the UE is in the local blacklist, the authentication server proceeds to step 930*b* and aborts the authentication. If the UE is not in the local blacklist, the authentication server proceeds to step 925*b* to verify the signature in the authentication package using the UE ID and GPK.

In step 925*b*, the authentication server verifies the signature in the authentication package using the UE ID and GPK. If verification is not successful, the authentication server proceeds to step 930*b* and aborts the authentication. If verification is successful, the authentication server proceeds to step 935*b* to allow the UE access to the network. Process 900*b* ends after either step 930*b* or 935*b*.

Essentially, the authentication server verifies whether the UE is in the local blacklist or the blacklist of the blacklist server in the relevant group before proceeding with the authentication procedure. Alternatively, the authentication server proceeds with the authentication procedure before verifying whether the UE is in the local blacklist or the blacklist of the blacklist server in the relevant group.

Figure 10:
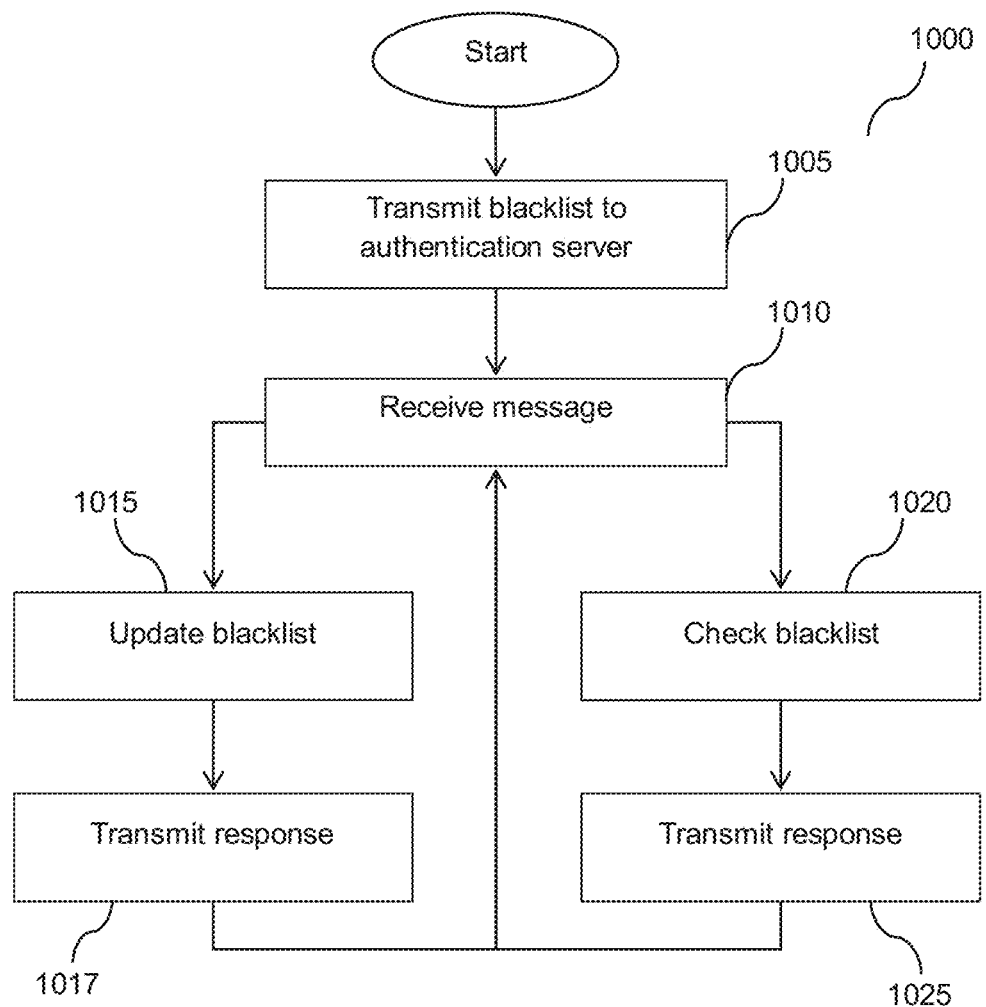
FIG. 10 illustrating a process 1000 performed by the blacklist server in accordance with an embodiment of this disclosure.

FIG. 10 illustrates a process 1000 performed by the blacklist server in accordance with this disclosure. Process 1000 begins with step 1005 by transmitting a blacklist to the authentication server in the same group.

In step 1010, the backlist server receives a message and determines whether the message is from an authentication server from another group or an order to include new UE ID in the blacklist. If the message is from an authentication server from another group, process 1000 proceeds to step 1020. If the message is an order to include new UE ID in the blacklist, process 1000 proceeds to step 1015.

In step 1015, the blacklist server updates its blacklist to include the UE ID. Thereafter, the blacklist server transmits the UE ID to the authentication servers of the same group to update respective blacklist to include the UE ID. Process 1000 then repeats from step 1010 to receive the next message.

In step 1020, the blacklist server checks its blacklist and determines whether the UE ID is in its blacklist. In step 1025, the blacklist server transmits a response indicating whether or not the UE ID is in its blacklist. Process 1000 then repeats from step 1010 to receive the next message.

It is noted that the UEs, network, PKG, blacklist servers and authentication servers are widely known. Hence, for brevity, the operating systems, configurations, structures, assemblies, etc are omitted. Importantly, the method and system in accordance with the disclosure is provided in the form of instructions stored on storage medium and executable by processors of respective UEs, networks, PKG, blacklist servers and authentication servers.

The proposed method and system in accordance with this disclosure can be applied in networks that adopt distributed authentication framework which implements IBC-based ID and keys and uses blacklist servers to maintain and distribute blacklist to authentication servers. A potential use could be the TOT device authentication in the 5G network. The proposed method and system can also be extended to wired broadband network access and Wi-Fi network access.

The above is a description of embodiments of a method and system of implementing a distributed blacklist servers for maintaining and distributing blacklist. It is foreseeable that those skilled in the art can and will design alternative method and system based on this disclosure that infringe upon this invention as set forth in the following claims.

What is claimed is:

1. A system for managing and distributing a blacklist of User Equipment IDs (UE IDs) in a network comprising:
   a plurality of groups of networks, each of the plurality of groups of networks comprising a blacklist server, and a plurality of authentication servers;
   wherein the blacklist server is configured to:
      store a blacklist containing UE IDs that are not allowed to gain access to the network;
      transmit the blacklist to the plurality of authentication servers in the same group;
      receive a message;
      determine a content in the message is an order to add a new revoked UE ID to the blacklist;
      update the blacklist to include the new revoked UE ID; and
      send an update blacklist message to the plurality of authentication servers in the same group;
   wherein each of the authentication servers is configured to:
      store the blacklist in response to receiving the blacklist from the blacklist server;
      receive an authentication package from a UE, the authentication package comprising a UE ID and a signature; wherein the signature is generated based on a private key of a group that the UE belongs to;
      proceed with an authentication procedure by verifying the signature;
      determine whether the UE is in the same group as the authentication server based on information in the authentication package in response to successfully verifying the signature; where UEs in the same group share one or more properties;
      transmit a query to the blacklist server belonging to the same group of the UE in response to the UE not being in the same group as the authentication server;
      receive a response from the blacklist server belonging to the same group of the UE;
      determine whether the UE is in the blacklist of the blacklist server belonging to the same group of the UE from the response; and
      allow the UE access to the network in response to the UE not being in the blacklist of the blacklist server belonging to the same group of the UE.

2. The system according to claim 1, further comprising a Package Key Generator (PKG), wherein the PKG is configured to:
   receive an order to add the new revoked UE ID to the blacklist;
   determine the groups of networks associated with the new revoked UE ID; and
   send an update blacklist message to the blacklist servers of the determined groups.

3. The system according to claim 1 wherein the blacklist server is further configured to:
   receive a query from one of the plurality of authentication servers from another group, the query containing a UE ID;
   determine whether the UE ID is in the blacklist; and
   transmit a response to the authentication server from another group that the UE ID is not in the blacklist in response to determining the UE ID is not in the blacklist, or transmit a response to the authentication server from another group that the UE ID is in the blacklist in response to determining the UE ID is in the blacklist.

4. A method for managing and distributing a blacklist of User Equipment IDs (UE IDs) in a network comprising a plurality of groups of networks, each of the plurality of groups of networks comprising a blacklist server, a plurality of authentication servers, and a Package Key Generator (PKG), wherein the method comprises the blacklist server:

storing a blacklist containing UE IDs that are not allowed to gain access to the network in the blacklist server;

transmitting the blacklist to the plurality of authentication servers in the same group;

receiving a message;

determining a content in the message is an order to add a new revoked UE ID in the blacklist;

updating the blacklist in the blacklist server to include the new revoked UE ID; and sending an update blacklist message to the plurality of authentication servers in the same group;

wherein the method further comprises each of the authentication servers:

storing the blacklist in response to receiving the blacklist from the blacklist server;

receiving an authentication package from a UE, the authentication package comprising a UE ID and a signature; wherein the signature is generated based on a private key of a group that the UE belongs to;

proceeding with an authentication procedure by verifying the signature;

determining whether the UE is in the same group as the authentication server based on information in the authentication package in response the successfully verifying the signature; where UEs in the same group share one or more properties;

transmitting a query to the blacklist server belonging to the same group of the UE in response to the UE not being in the same group as the authentication server;

receiving a response from the blacklist server belonging to the same group of the UE;

determining whether the UE is in the blacklist of the blacklist server belonging to the same group of the UE from the response; and allowing the UE access to the network in response to the UE not being in the blacklist of the blacklist server belonging to the same group of the UE.

5. The method according to claim 4, wherein the network further comprises a Package Key Generator (PKG), wherein the method comprises the PKG:

receiving an order to add the new revoked UE ID to the blacklist;

determining the groups of networks associated with the UE ID;

sending an update blacklist message to the blacklist servers of the determined groups.

6. The method according to claim 4 wherein the method further comprises the blacklist server:

receiving a query from one of the plurality of authentication servers from another group, the query containing a UE ID;

determining whether the UE ID is in the blacklist; and transmitting a response to the authentication server from another group that the UE ID is not in the blacklist in response to determining the UE ID is not in the blacklist or transmitting a response to the authentication server from another group that the UE ID is in the blacklist in response to determining the UE ID is in the blacklist.

* * * * *